US005890872A

United States Patent [19]

Todoki et al.

[11] Patent Number: 5,890,872

[45] Date of Patent: *Apr. 6, 1999

[54] SORTING APPARATUS FOR PHOTOGRAPHIC PRINTER

[75] Inventors: Kenji Todoki, Wakayama; Takuji Yamaguchi, Wakayama-ken, both of Japan

[73] Assignee: Noritsu Koki Co., Ltd., Wakayama-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 587,369

[22] Filed: Jan. 16, 1996

[30] Foreign Application Priority Data

| | | | |
|---|---|---|---|
| Jan. 18, 1995 | [JP] | Japan | 7-005750 |
| Nov. 10, 1995 | [JP] | Japan | 7-292885 |
| Jan. 16, 1996 | [JP] | Japan | 8-004628 |

[51] Int. Cl.[6] ..... B65G 47/88

[52] U.S. Cl. ..... 414/790.3; 414/794.3

[58] Field of Search ..... 414/790.3, 790.6, 414/790.7, 794.3, 793.4

[56] References Cited

U.S. PATENT DOCUMENTS

| | | | |
|---|---|---|---|
| 2,672,079 | 3/1954 | Chandler | 93/93 |
| 3,221,902 | 12/1965 | Young | 414/790.3 |
| 3,434,603 | 3/1969 | Horman | 414/793.4 X |
| 4,518,300 | 5/1985 | Kent | 414/790.7 X |
| 4,708,564 | 11/1987 | Mylrea et al. | 414/791.6 X |
| 4,902,195 | 2/1990 | Lucas | 414/794.3 X |
| 5,052,679 | 10/1991 | Sekino | 271/293 |
| 5,238,120 | 8/1993 | Ballestrazzi et al. | 414/790.3 X |
| 5,274,422 | 12/1993 | Yoshikawa | 355/77 |
| 5,503,388 | 4/1996 | Guenther et al. | 414/790.3 X |

FOREIGN PATENT DOCUMENTS

| | | | |
|---|---|---|---|
| 2 575 735 | 7/1986 | France | 414/793.4 |
| 2150843 | 6/1990 | Japan . | |
| 2267552 | 11/1990 | Japan . | |

*Primary Examiner*—Janice L. Krizek
*Attorney, Agent, or Firm*—Fulbright and Jaworski, LLP

[57] ABSTRACT

A sorting apparatus for sorting a plurality of prints produced by a photographic printer. The apparatus includes a movable table for mounting the prints thereon, and a stopper member disposed on an upper surface of the movable table for coming into contact with the prints mounted on the movable table. The movable table is projectable and retractable relative to the stopper member. With a retracting movement of the movable table relative to the stopper member, the prints mounted on the movable table are caused to come into contact with the stopper member and to be dropped off the table to be sorted.

11 Claims, 10 Drawing Sheets

(a)

(b)

(a)

(b)

SORTING APPARATUS FOR PHOTOGRAPHIC PRINTER

BACKGROUND OF THE INVENTION

1. Field of the Invention

The present invention relates to a sorting apparatus for use in combination with e.g. an automatic photographic printer for sorting prints generated from the printer.

2. Description of the Related Art

A typical conventional sorting apparatus of the above-noted type is shown in FIG. 11. To briefly describe this apparatus, prints 40 discharged one after another from a discharge opening of a photographic printer not shown are received on an upper surface of a fixed receiver table 30. Then, when prints 40 of one negative film roll are produced, a plurality of movable members 31 protruding upward from the receiver table 30 are translated to one side of the table 30 as illustrated in FIG. 11(*b*) to move the prints 40 to cause them to drop onto to a belt conveyer 29 disposed on this side. In this manner, the apparatus effects a sorting operation of the prints.

With the above convention, however, the prints 40 are caused to drop onto the belt conveyer 29 from an obliquely upper position by using the movable member 31. Hence, if the movable members 31 are driven too fast, this will result in irregularity in the location on the belt conveyer 29 onto which the prints 40 are dropped. Further, when dropped onto the conveyer 29, the prints 40 tend to be scattered about. On the other hand, if the movable members 31 are driven slowly, this will incline the prints 40 obliquely downwards from the receiver table 30, so that these prints 40 will 'collapse' from the receiver table 30, as illustrated in FIG. 11(*b*). Then, in this case too, the prints 40 when dropped will be scattered about as illustrated in FIG. 11(*c*).

In addition, in many cases, the movable members 31 need to move prints 40 of various numbers and sizes. Then, even the scattering pattern of the dropped prints 40 may be irregular. Accordingly, such irregularity in the sorted or un-sorted conditions of the dropped prints would invite a problem in the subsequent process of the prints.

SUMMARY OF THE INVENTION

The present invention attends to the above-described drawbacks of the prior art and its primary object is to provide an improved sorting apparatus which always can neatly sort out prints discharged from a printer regardless of the number and/or size of the prints.

For fulfilling the above-noted object, a sorting apparatus for use with a printer, according to the present invention, comprises: a movable table for mounting prints thereon; a stopper member disposed on an upper surface of the movable table for coming into contact with the prints mounted on the movable table; the movable table being projectable and retractable relative to the stopper member; wherein with a retracting movement of the movable table relative to the stopper member, the prints mounted on the movable table are caused to come into contact with the stopper member and to be dropped off the table to be sorted.

With the above-described construction, edges of the respective prints can be neatly aligned as these prints mounted on the movable table come into contact with the stopper member. Then, with being maintained in this contact with the stopper member, the movable member is moved in the retracting direction to cause the prints to be dropped off the table to be sorted. As the prints are allowed to be dropped substantially perpendicularly with their edges aligned, the prints can be sorted neatly.

As a result, the subsequent process of these prints may be effected smoothly without troubles.

According to one aspect of the invention, the stopper member is rendered movable together with the movable table, such that the movable table is retracted after the stopper member and the movable table are moved together.

With this construction, the prints discharged from the discharge opening of the printer may be transported e.g. laterally to be neatly sorted while the prints are kept mounted on the movable table. Hence, this construction allows greater freedom in the assembly of the sorting apparatus with the printer. Further, through setting of a stop position of the stopper member, the dropping or sorting position of the prints may be freely selected, or the edges of any prints may be neatly aligned regardless of the size of the prints.

Accordingly, even when the printer has a significant height which presents difficulty in handling of the prints after sorting thereof, the prints may be sorted with the edges thereof being aligned with the forward side of the printer. So that, the subsequent handling of the prints can be facilitated.

According to a still further aspect of the invention, the stopper member is rendered movable relative to the movable table, such that the movable table is retracted relative to the stopper after the stopper member is moved relative to the movable table.

With this construction, like the above-described construction, through setting of a stop position of the stopper member, the dropping or sorting position of the prints may be freely selected, or the edges of any prints may be neatly aligned regardless of the size of the prints. And, the prints may be sorted to a position which advantageously facilitates the subsequent handling thereof.

According to a still further aspect of the invention, an upper surface of the movable table has a step for allowing the prints to ride thereon in an overhanging manner, the upper surface having a downward inclination as extending toward a discharge opening of the prints from the printer.

With this construction, the prints discharged from the discharge opening onto the movable table may reliably be allowed to ride on the step along the inclined surface in the overhanging manner. Thus, when the movable table is moved in the retracting direction relative to the stopper member, there occurs no jamming of the prints into the gap formed between the upper surface of this movable table and the bottom surface of the stopper member. Accordingly, the gravity sorting operation of the prints may be effected more reliably.

According to a still further aspect of the invention, the sorting apparatus further comprising first driving means for driving the movable table, second driving means for driving the stopper member, and a drive source for driving both first and second driving means.

With the above, in comparison with a further construction in which the movable table and the stopper member are driven by separate drive sources, the entire apparatus may be formed more compactly.

According to a still further aspect of the invention, the apparatus further comprising a movable-table support block for supporting the movable table, a stopper support block for supporting the stopper member, and a slide shaft on which the movable-table support block and the stopper support block are slidably mounted, said first drive means including a first rotary element (e.g. a sprocket) and a first connecting member (e.g. a chain) operatively associated with said first rotary element, said second drive means including a second rotary element and a second connecting member operatively associated with said second rotary element, said movable-table support block being engaged with said first connecting member, said stopper support block being engaged with said second connecting member, said first rotary element and said second rotary element being disposed coaxially.

With the above construction, the above-described rather complicated relative movements between the movable table and the stopper member may be reliably provided by using those components such as the movable-table support block, chain, sprocket and the stopper support block, chain, sprocket and so on. Moreover, as the movable-table support block and the stopper support block are mounted on the same slide shaft and the first and second rotary elements are disposed coaxially, the entire construction may be formed compactly and its assembly with the printer may be further facilitated.

According to a still further aspect of the invention, the first rotary element and the second rotary element are mounted on a single drive shaft to be rotatable relative to each other. This drive shaft and the first rotary element are operatively coupled with each other via a friction mechanism. And, the drive shaft and the second rotary element are operatively coupled with each other via a one-way clutch mechanism. The drive shaft and the second rotary element are operatively coupled with each other also via a clutch mechanism. A stopper is provided for coming into contact with the movable-table support block for regulating movement of the movable-table support block. The drive shaft is operatively coupled with a reversible motor.

With the above construction, the complex relative movements between the movable table and the stopper member may be automatically effected by using the single reversible motor. Hence, this construction allows weight reduction of the apparatus as well as cost reduction of the same.

According to a still further aspect of the invention, said clutch mechanism includes a first gear formed integral with the second rotary element, a second gear fixed to the drive shaft, and a free gear mounted to the movable-table support block, rotation of the second gear being transmitted via the free gear to the first gear.

Rotation in one direction of the motor may be transmitted to the second rotary element via the drive shaft and the one-way clutch mechanism, while rotation in the other direction may not. With the above construction, the rotation in the other direction of the motor may be transmitted via the second gear, the free gear and the first gear to the second rotary element. Further, this transmission of the rotation in the other direction of the motor is allowed only when the free gear meshes with both the first gear and the second gear.

The clutch mechanism having the above construction is simple as being comprised mainly of the gears.

Preferably, at least one of the first gear and second gear includes a mechanism for absorbing a difference between the tooth phases of these first and second gears.

In transmitting the rotation of the motor to the second rotary element through the clutch mechanism, it is necessary for the free gear mounted to the movable-table support block to mesh with both the first gear and the second gear. In this, if a difference is present between the tooth phases of these gears, the simultaneous meshing engagements may not take place smoothly. And, such un-smooth engagements may present a problem in the durability of the mechanism.

Accordingly, by providing the mechanism capable of absorbing a difference between the tooth phases of the two gears, the simultaneous meshing engagements between the free gear and the first and second gears may be effected smoothly. And, the durability of the clutch mechanism may be improved.

According to a still further aspect of the invention, the apparatus further comprises a position detector for detecting a position of the stopper support block for controlling a change in the stop position of the stopper member.

With this construction, with automatic change in the stop position of the stopper member, the drop-sorting position of the prints may be selected. Or, any prints, regardless of size thereof, may be neatly aligned at their edges.

According to a still further aspect of the invention, the apparatus further comprises a belt conveyer disposed at the drop position of the prints downwardly of the movable table.

With this construction, the sorted prints may be automatically transported to a desired position. Hence, this will contribute to improvement of the convenience of the printer.

Further and other objects, features and effects of the invention will become more apparent from the following more detailed description of the embodiments of the invention with reference to the accompanying drawings.

DETAILED DESCRIPTION OF THE PREFERRED EMBODIMENTS

A sorting apparatus, according to a first embodiment of the present invention, for use with a photographic printer will be described in detail with reference to FIGS. 1 through 7.

Figure 1:
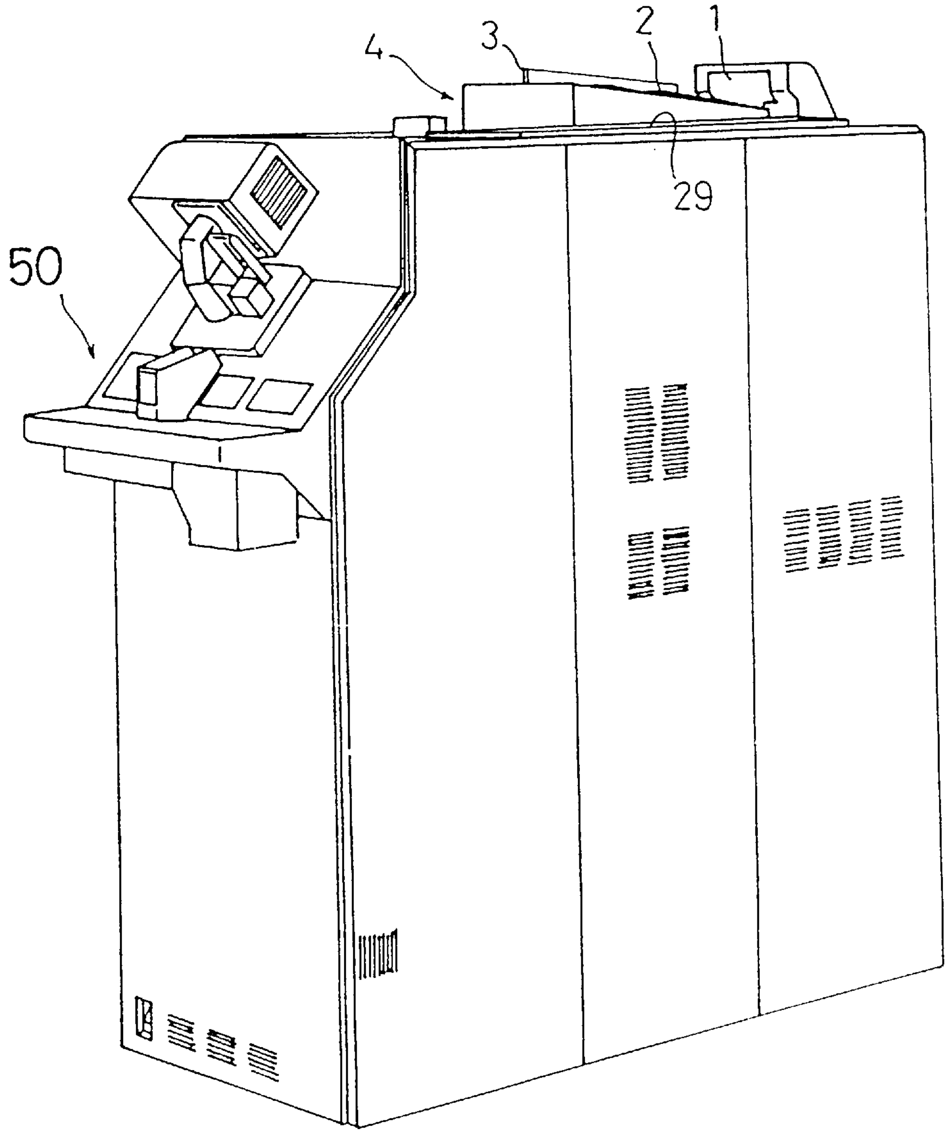
FIG. 1 is an overall perspective view of an automatic photographic printer relating to a first embodiment.

FIG. 1 shows, in its entirety, an automatic photographic printer for producing color prints from a negative film. Though not described in detail, upon designations of the number or size of prints to be produced by operating a control unit 50, images of the negative film are printed onto a color print paper by a printing device accommodated inside the printer. Then, various processes such as development, water-washing and so on are effected on this print paper, and the paper is dried by a drying unit and then cut into color prints 40 of a predetermined size, which are discharged one after another through a discharge opening 1 to be supplied onto a sorting apparatus which is disposed downwardly of the discharge opening 1.

Figure 4:
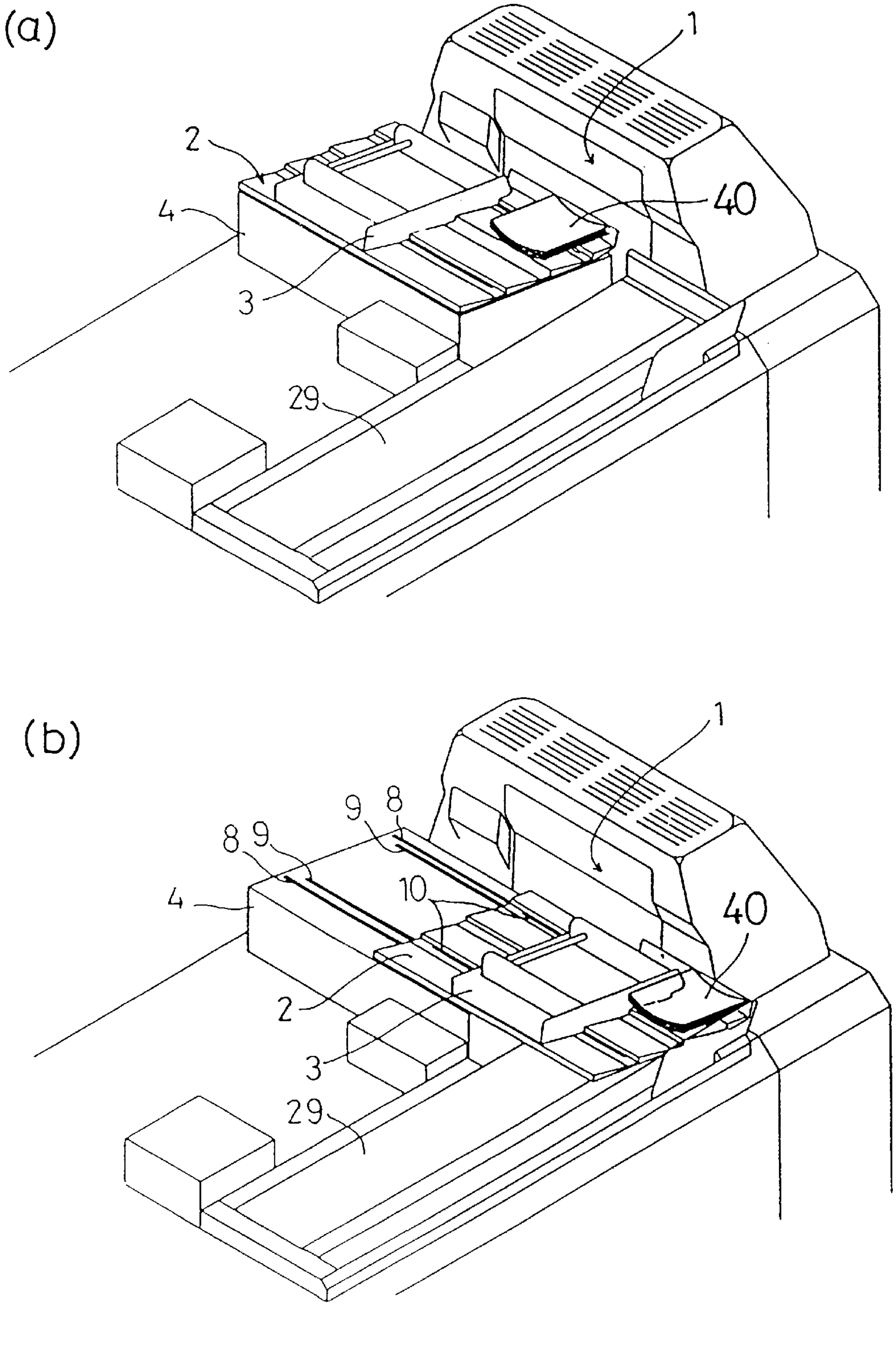
Figure 5:
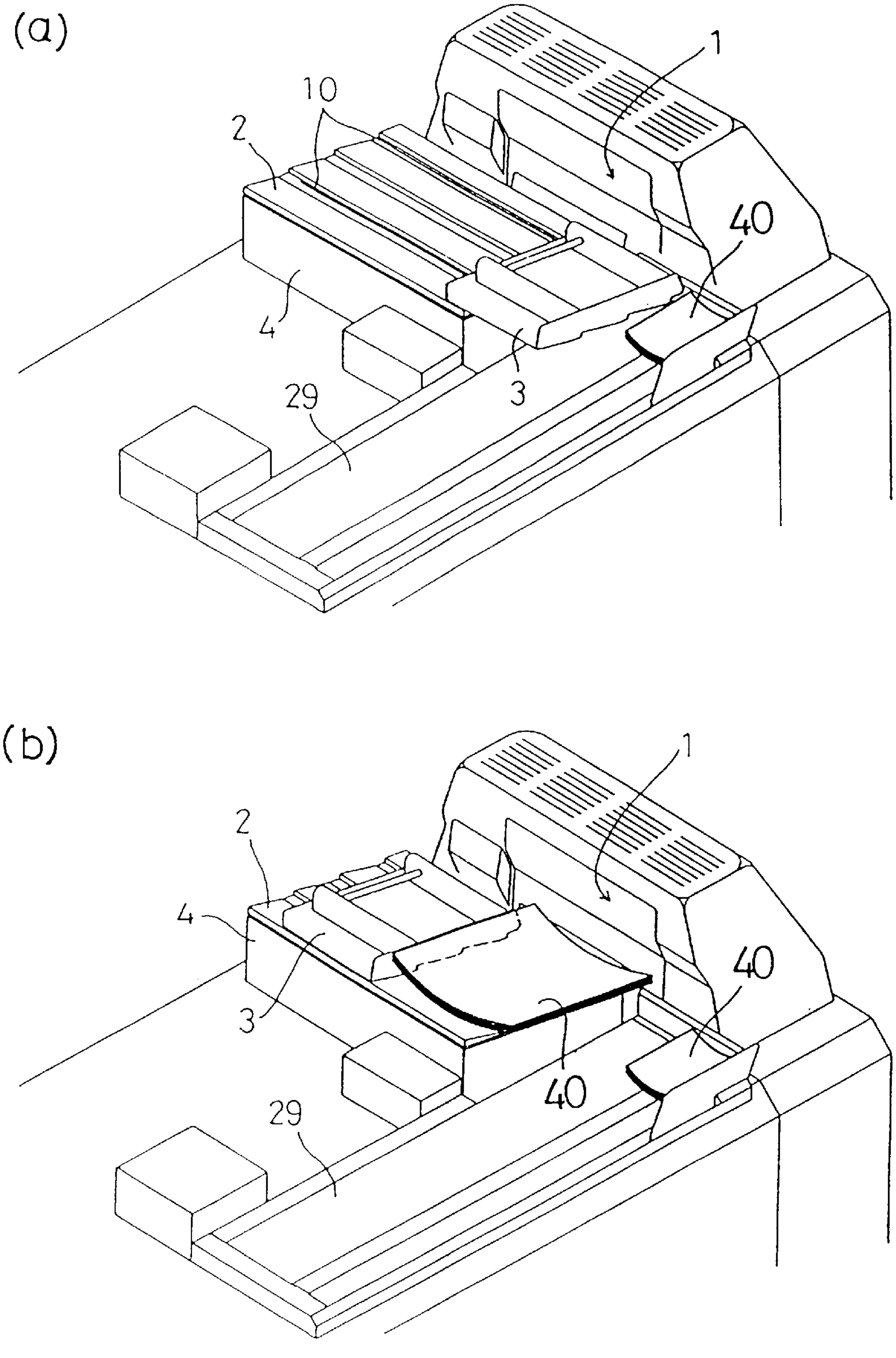
Figure 6:
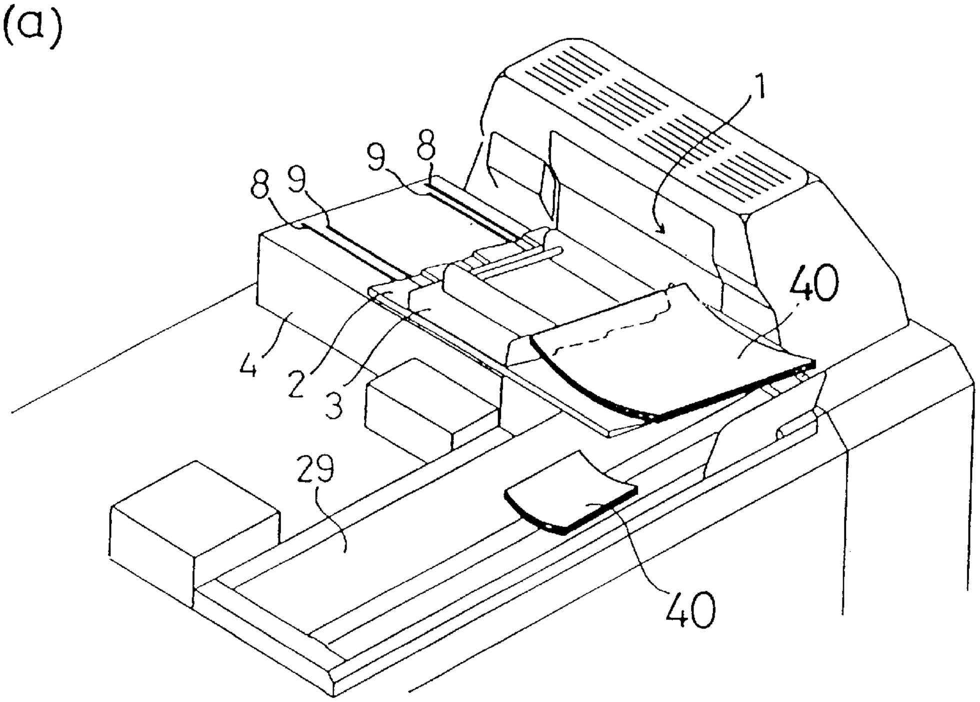
Figure 6:
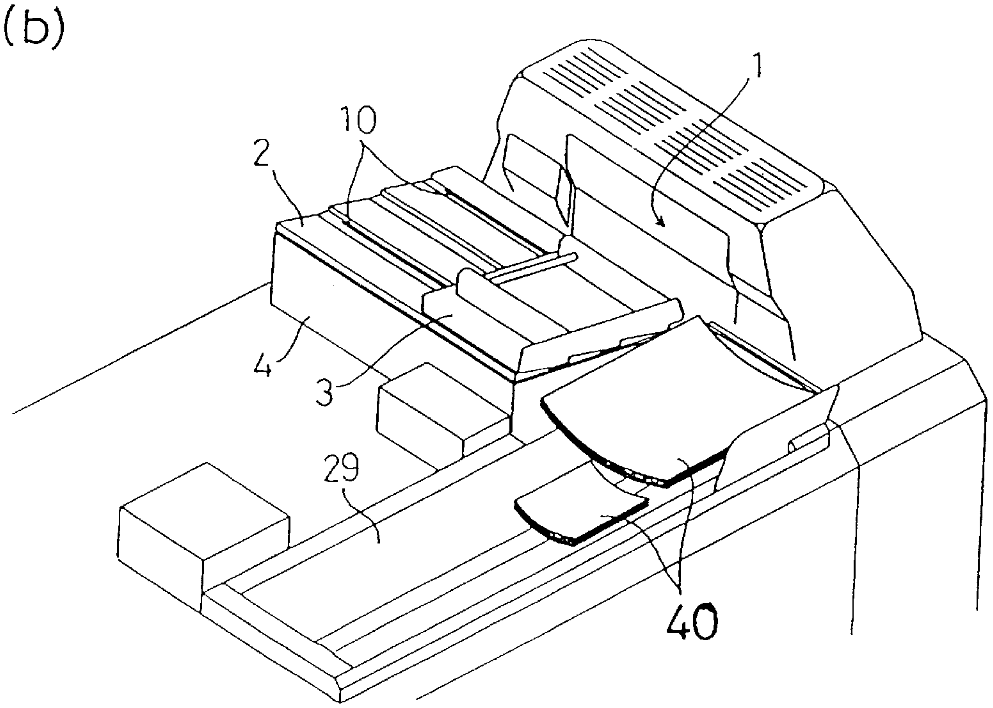

This sorting apparatus according to the invention, as shown in FIGS. 4 through 6, includes a movable table 2 for mounting thereon the color prints 40 discharged one after another from the discharge opening 1 of the printer and a stopper member 3 disposed on the upper surface of the movable table 2 for coming into contact with the color prints 40 as mounted on the movable table 2. And, the movable table 2 and the stopper member 3 are both movable relative to a casing 4 of the sorting apparatus.

Figure 2:
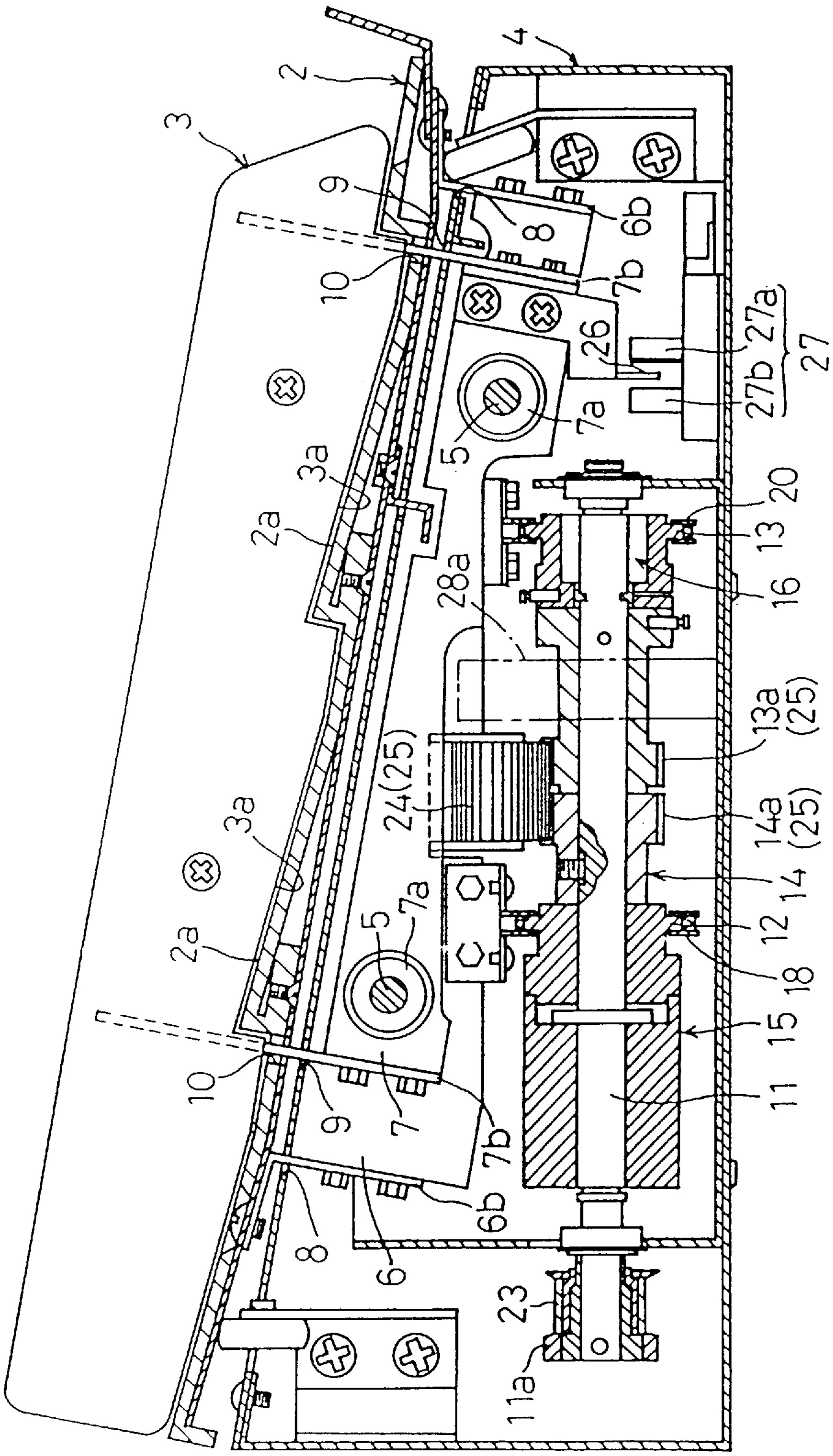
FIG. 2 is a section view of a sorting apparatus of the first embodiment.
Figure 3:
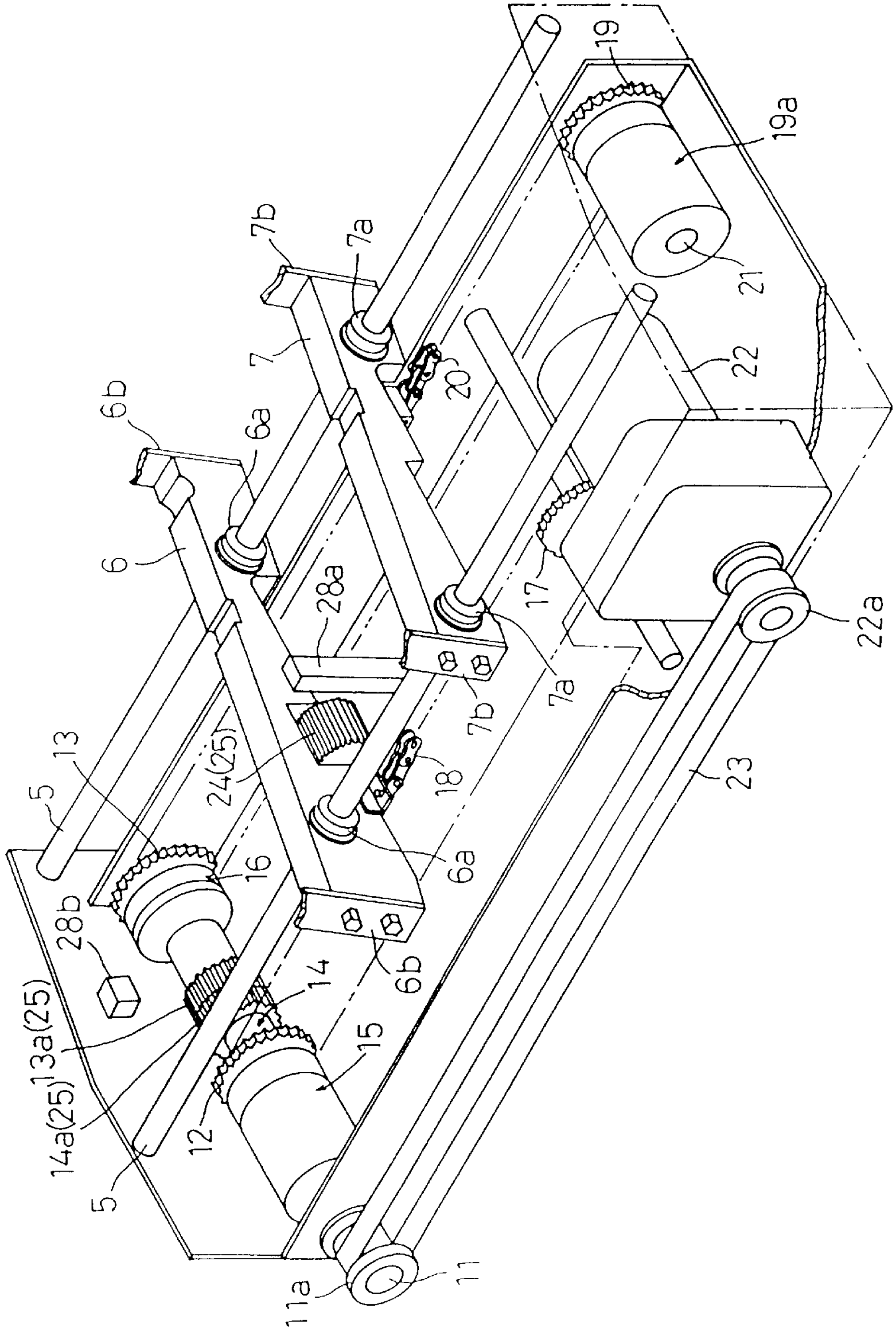
FIG. 3 is a partially cutaway perspective view of the sorting apparatus of the first embodiment, FIGS. 4(*a*) and (*b*) are perspective views illustrating operational conditions of the sorting apparatus of the first embodiment, FIGS. 5(*a*) and 5(*b*) are perspective views illustrating operational conditions of the sorting apparatus of the first embodiment, FIGS. 6(*a*) and (*b*) are perspective views illustrating operational conditions of the sorting apparatus of the first embodiment, FIG. 7(*a*) through (*f*) are schematic views illustrating the operational conditions of the sorting apparatus of the first embodiment.

As may be apparent from FIG. 2, the upper surface of the movable table 2 comprises an inclined surface having a generally upward inclination as extending away from the discharge opening 1 of the printer. Further, this upper surface has a sawtoothed configuration formed of a plurality of steps 2*a*, with an upper surface of each step 2*a* having a downward inclination as extending toward the discharge opening 1. With these arrangements, the color prints 40 discharged from the discharge opening 1, irrespectively of their sizes, may ride over the step 2*a* in an overhanging manner. Further, a corresponding bottom surface of the stopper 3 has a matching sawtoothed configuration having a plurality of steps 3*a*.

Inside the casing 4, a pair of slide shafts 5 extending along the length of the casing 4 are fixedly disposed. These slide shafts 5 slidably mount thereon a movable-table support block 6 and a stopper support block 7 via slide bearings 6*a*, 7*a* respectively, with the stopper support block 7 being disposed on the forward side of the printer.

The movable-table block 6 fixedly supports the movable table 2 via its plate-like joints 6*b*. Likewise, the stopper support block 7 fixedly supports the stopper member 3 via its plate-like joints 7*b*. Correspondingly, the upper surface of the casing 4 defines a pair of slits 8 through which the joints 6*b* of the movable-table support block 6 extend and also defines a further pair of slits 9 through which the joints 7*b* of the stopper support block 7 extend. Further, the movable table 2 defines a pair of slits 10, through which the joints 7*b* of the stopper support block 7 extend.

At a rear region inside the casing 4 and downwardly of the slide shafts 5, there is rotatably disposed a drive shaft 11 extending normal to the slide shafts 5. This drive shaft 11 mounts a movable-table drive sprocket 12 adjacent one end thereof, a stopper drive sprocket 13 adjacent the other end thereof and further mounts a clutch member 14 at an intermediate portion thereof, respectively.

Between the movable-table drive sprocket 12 and the drive shaft 11, there is interposed a friction mechanism 15 which effects a relative slipping action when the movable-table drive sprocket 12 is subjected to a resistance force exceeding a predetermined magnitude. Between the stopper drive sprocket 13 and the drive shaft 11, there is interposed a one-way clutch 16. The clutch member 14, which is fixed to the drive shaft 11, integrally includes a clutch gear 14*a* (hereinafter '*a* second gear 14*a*'), which is disposed adjacent a clutch gear 13*a* (hereinafter '*a* first gear 13*a*') integrally of the stopper drive sprocket 13.

A movable-table drive chain 18 is entrained between the movable-table drive sprocket 12 and a free sprocket 17. A stopper drive chain 20 is entrained between the stopper drive sprocket 13 and a free sprocket 19. The latter free sprocket 19, on which the stopper drive chain 20 is entrained, is mounted on a fixed shaft 21 fixed to the casing 4. Further, between this fixed shaft 21 and the free sprocket 19, there is interposed a friction mechanism 19 having a substantially same construction as the afore-described friction mechanism 15, so that the free sprocket 19 is not rotated unless the stopper drive chain 20 receives a driving force beyond a predetermined magnitude.

The movable-table drive chain 18 and the stopper drive chain 20 are operatively coupled with the movable-table support block 6 and the stopper support block 7, respectively. A toothed belt 23 is entrained between a pulley 11*a* fixed to the drive shaft 11 and a shaft of a reversible DC motor 22 having a reduction mechanism. Also, the movable-table support block 6 rotatably mounts a free gear 24 which can mesh with the first gear 13*a* and the second gear 14*a* for operatively coupling the drive shaft 11 and the stopper drive sprocket 13 to each other. These first and second gears 13*a*, 14*a* and the free gear 24 together constitute a clutch mechanism 25.

As shown in FIG. 2, the stopper support block 7 includes a position detecting plate 26 extending downwards therefrom. Within a movable range of this position detecting plate 26, there is provided a position detector 27 comprised of a light emitter 27*a* and a light receiver 27*b*, for the purpose of controlling a change in the stop position of the stopper member 3. Within a movable range of the movable-table support block 6, there are provided a stopper 28*a* for contacting the movable-table support block 6 so as to restrict movement of this block 6 toward the forward side of the printer and a further stopper 28*b* for also contacting the movable-table support block 6 so as to restrict opposite movement of this block 6 toward a rear side of the printer.

Toward the more forward side of the printer than the above-described sorting apparatus, a belt conveyer 29 is disposed for receiving and transporting one after another the color prints 40 dropped off the movable table 2.

Next, the operations of this sorting apparatus will be described. First, when the movable-table support block 6 and the stopper support block 7 are located on the rear side of the printer, namely, on the side of the drive shaft 11, the color prints 40 are discharged from the discharge opening 1. In this, as illustrated in FIG. 4(*a*), the movable table 2 is disposed downwardly of the discharge opening 1 and also the stopper member 3 is disposed more rearwardly of the printer than the discharge opening 1, so that the color prints 40 are discharged onto the movable table 2 under this condition.

When the accumulated or stacked color prints 40 reaches a predetermined amount, or more specifically, when the color prints 40 of one entire negative film roll are produced, this is detected by an unillustrated sensor. Upon this detection, the motor 22 is rotated forwardly to forwardly rotate the drive shaft 11 via the pulley 22*a*, the toothed belt 23 and the pulley 11*a*.

In association with this forward rotation of the drive shaft 11, the movable-table drive sprocket 12 and the stopper drive sprocket 13 both effect forward rotations to drive the movable-table drive chain 18 and the stopper drive chain 20, respectively. Accordingly, the movable-table support block 6 and the stopper support block 7 are slided along the slide shafts 5, whereby the movable table 2 and the stopper member 3 are together moved toward the forward side of the printer.

After being moved by a predetermined distance, the movable-table support block 6 comes into contact with the stopper 28*a*, whereby the block 6 is prevented from being moved farther. In this condition, a slippage is caused by the function of the friction mechanism 15, so that the movable-table drive sprocket 12 stops its rotation in spite of the continued forward rotation of the drive shaft 11.

Thereafter, as illustrated in FIG. 4(*b*), only the stopper member 3 is further moved toward the forward side of the printer. Then, when the position detecting plate 26 extending downwardly from the stopper support block 7 traverses the position detector 27, the motor 22 terminates its forward rotation to stop the stopper member 3, and then the motor 22 effects a reverse rotation.

In association with this reverse rotation of the motor 22, the drive shaft 11 too is rotated reversely so as to urge reverse rotations of the movable-table drive sprocket 12 and the stopper drive sprocket 13. However, such reverse rotation of the stopper drive sprocket 13 is prevented by the function of the one-way clutch 16 interposed between this sprocket 13 and the drive shaft 11, so that the movable-table drive sprocket 12 alone is allowed to rotate reversely.

With the above, the movable-table support block 6 is moved toward the rear side of the printer. Then, as illustrated in FIG. 5(*a*), while the stopper member 3 is maintained still, the movable table 2 is retracted away from this stopper member 3, such that the color prints 40 on the movable table 2 with the positions thereof regulated through the contact with the stopper member 3 are allowed, in this condition, to be dropped onto the belt conveyer 29 disposed downwardly. This completes a sorting operation of the prints.

In the course of the above-described process, since the color prints 40 are riding in an overhanging manner on the plural steps 2*a* formed on the upper surface of the movable table 2, the color prints 40 are prevented from being jammed between this upper surface of the movable table 2 and the bottom surface of the stopper member 3. Especially, in the instant embodiment, the color prints 40 overhangingly ride on more than two steps 2*a*, the jamming trouble of the prints 40 may be prevented more reliably.

Further, since the free sprocket 19 on which the stopper drive chain 20 is entrained is subjected to the frictional force from the friction mechanism 19*a*, even if the stopper member 3 is subjected to an urging force toward the rear side of the printer via the color prints 40 during the retracting movement of the movable table 2, the frictional force can reliably maintain the stopper member 3 at the predetermined stop position against such urging force. Consequently, a positioning error of the color prints 40 may be reliably prevented.

With completion of the sorting operation of the color prints 40 as described above, and when the movable-table support block 6 is moved toward the rear side of the printer to come into contact with the stopper 28*b*, slippage is caused by the function of the friction mechanism 15. So that, in spite of the continued reverse rotation of the drive shaft 11, the rotation of the movable-table drive sprocket 12 is stopped, and simultaneously the free gear 24 mounted to the movable-table support block 6 comes into meshing with the first gear 13*a* of the stopper drive sprocket 13 and the second gear 14*a* of the clutch member 14, thereby to integrally couple the drive shaft 11 and the stopper drive sprocket 13 to each other.

Figure 7:
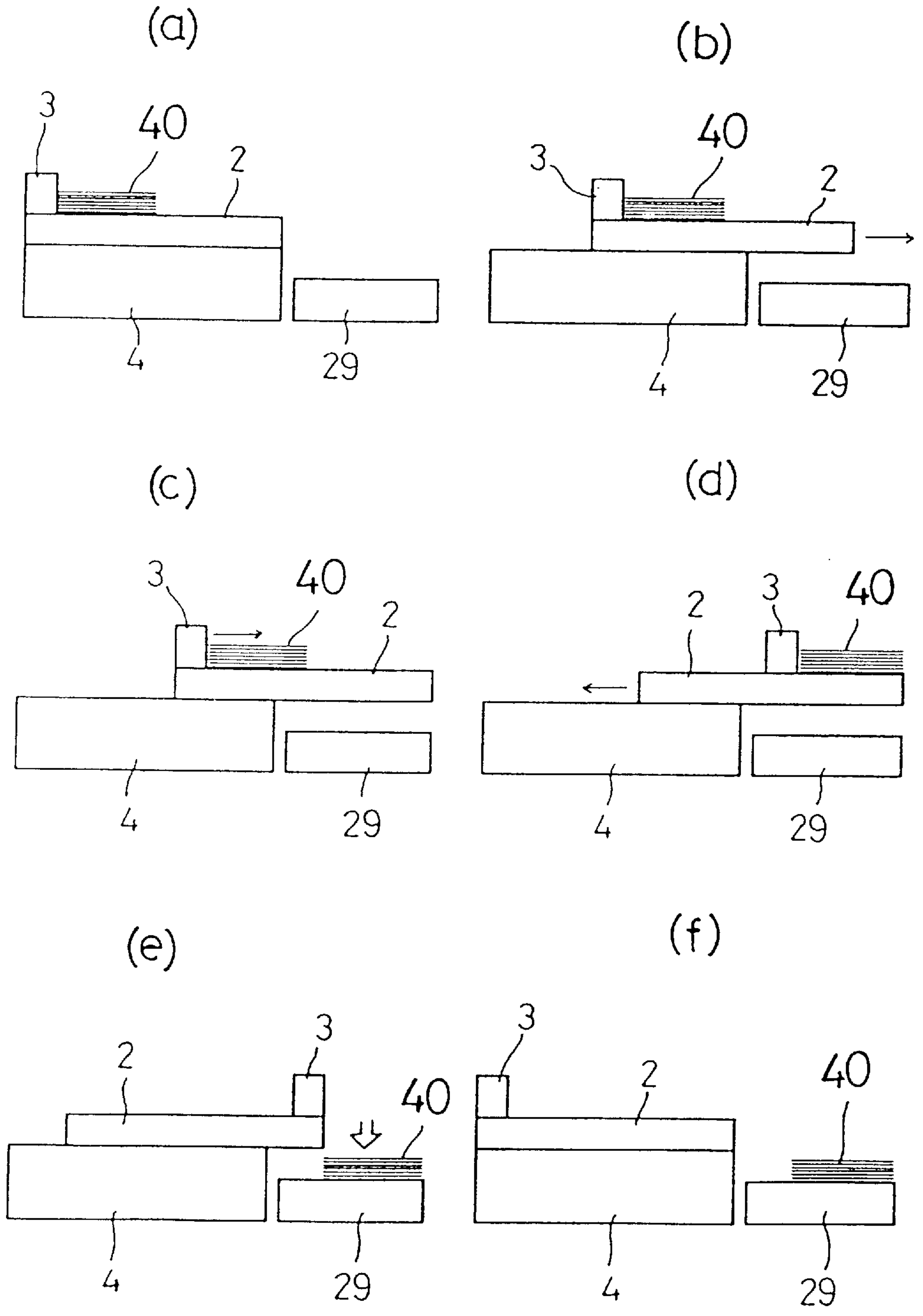

Then, the stopper drive sprocket 13 effects reverse rotation to drive the stopper drive chain 20 and the stopper member 3 too is moved toward the rear side of the printer 3, the motor 22 is stopped, and the belt conveyer 29 is moved a predetermined distance to be set to the initial condition. The above-described serial processes are schematically illustrated in FIGS. 7(i a) through (*f*).

Incidentally, for changing the size of the color prints 40 to a new size, this new size can be designated with an operation of the control unit of the printer. With this designation, the stop position of the stopper 3 is changed. More specifically, in the foregoing description of the operations, the motor 22 stops its forward rotation to stop the stopper member 3 simultaneously with the position detecting plate 26 extending downwardly from the stopper support block 7, traversing the position detector 27. Instead, with such designation of a new size by the control unit the stop position of the stopper member 3 will be changed as the motor 22 will be stopped not simultaneously but with lapse of one second or two seconds after the position detecting plate 26 has traversed the position detector 27, for instance. Accordingly, irrespectively of the size of the color prints 40, the front edges of the stacked color prints 40 can always be brought into neat alignment with the frontal edge of the belt conveyer 29. The operational processes for this sorting operation are illustrated in FIG. 5(*b*) and FIGS. 6(*a*) and (*b*).

[second embodiment]

A second embodiment of the invention will be described with reference to FIGS. 8 through 10. This embodiment relates to improvement of the clutch mechanism 25 described hereinbefore. The other constructions than this clutch mechanism 25 remain the same and will therefore not be described to avoid redundancy.

As described supra, when a sorting operation of the color prints 40 is completed and the movable-table support block 6 is moved toward the rear side of the printer to come into contact with the stopper 28*b*, a slippage is caused by the function of the friction mechanism 15. So that, in spite of the continued reverse rotation of the drive shaft 11, the rotation of the movable-table drive sprocket 12 is stopped, and simultaneously the free gear 24 mounted to the movable-table support block 6 comes into meshing with the first gear 13*a* of the stopper drive sprocket 13 and the second gear 14*a* of the clutch member 14, thereby to integrally couple the drive shaft 11 and the stopper drive sprocket 13 to each other.

As described above, the free gear 24 is to come into meshing with the first gear 13*a* and the second gear 14*a* simultaneously. So, for facilitating these meshing engagements between the free gear 24 and the first and second gears 13*a*, 14*a*, the free gear 24 is mounted to be freely rotatable relative to the movable-table support block 6.

However, in order for the simultaneous meshing engagements between the free gear 24 and the first gear 13*a* and the second gear 14*a* to take place smoothly, it is necessary that the tooth phase of the first gear 13*a* and that of the second gear 14*a* exactly match each other. Otherwise, i.e. with a difference between the tooth phases, the simultaneous meshing engagements cannot take place smoothly. Or, if such un-smooth engagements are forced, this will lead to a malfunction or even to deterioration in the life of the clutch mechanism 25. Accordingly, it is preferred that the clutch mechanism 25 be constructed with taking this respect into consideration.

Figure 8:
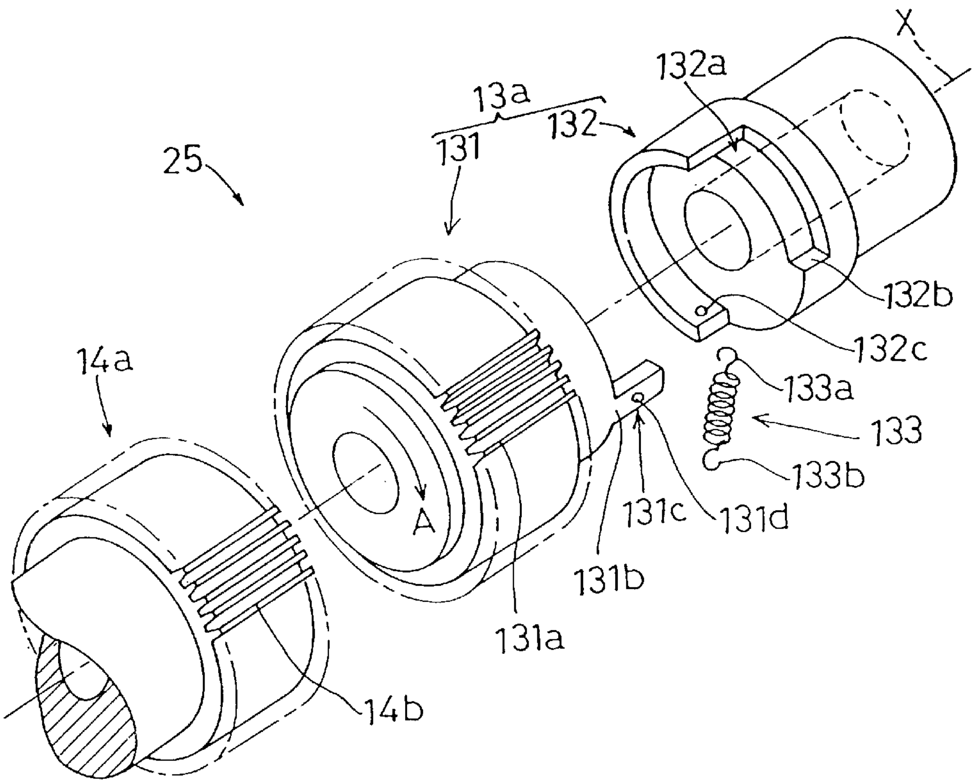
FIG. 8 is a perspective view of a clutch gear mechanism relating to a second embodiment.
Figure 9:
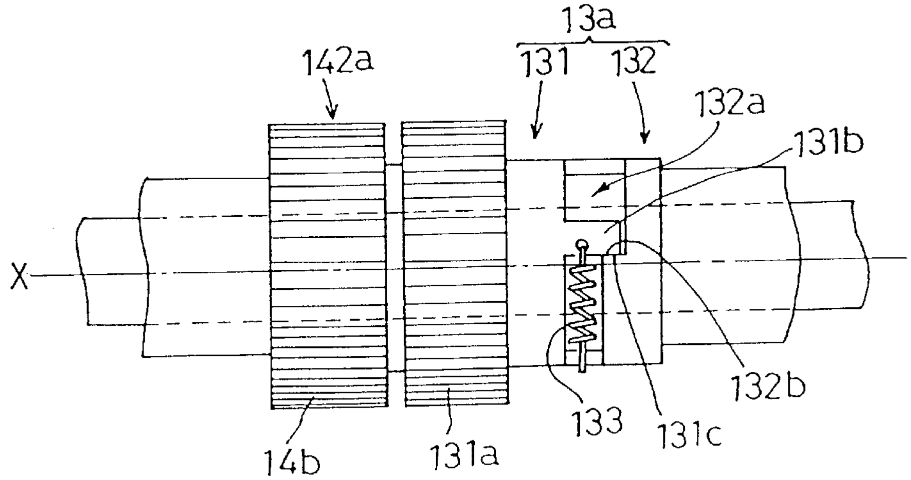
FIG. 9 is side view of the clutch gear mechanism relating to the second embodiment, FIGS. 10(*a*) and (*b*) are operation views of the clutch gear mechanism of the second embodiment, and FIGS. 11(*a*) through (*c*) are schematic views illustrating operational conditions of a conventional sorting apparatus.

Now, FIG. 8 is a perspective exploded view of such clutch mechanism 25 improved in the above-described respect. In this embodiment, the construction of the second gear 14*a* remains the same as that of the foregoing embodiment. Whereas, the first gear 13*a* is comprised now of two parts, namely, a first rotary element 131 and a second rotary element 132. The first rotary element 131 includes a toothed portion 131*a* for meshing the teeth of the free gear 24, a projecting portion 131*b* extending along the axial direction of the drive shaft 11, an end face portion 131*c* formed in the projecting portion 131*b*, and a hole 131*d* defined in the projecting portion 131*b*. The second rotary element 132 includes a recess portion 132*a* for defining a space for allowing movement of the projecting portion 131*b* of the first rotary element 131, an end face portion 132*b* for contacting the end face portion 131*c* of the projecting portion 131*b*, and a hole 132*c*. A spring 133 includes a hook 133*a* engageable with the hole 131*d* and a further hook 133*b* engageable with the hole 132*c*. This spring 132 urges the first rotary element 131 to rotate it about the axis X of the drive shaft 11 in a direction of an arrow A in FIGS. 8 and 10. In this urged state, the end face portion 131*c* and the end face portion 132*b* are placed in contact with each other.

Incidentally, the second gear 14*a* includes a toothed portion 14*b* meshable with the teeth of the free gear 24.

Preferably, the first rotary element 131, the second rotary element 132 and the spring 133 together constituting this first gear 13*a* will be provided as one integral unit.

Figure 10:
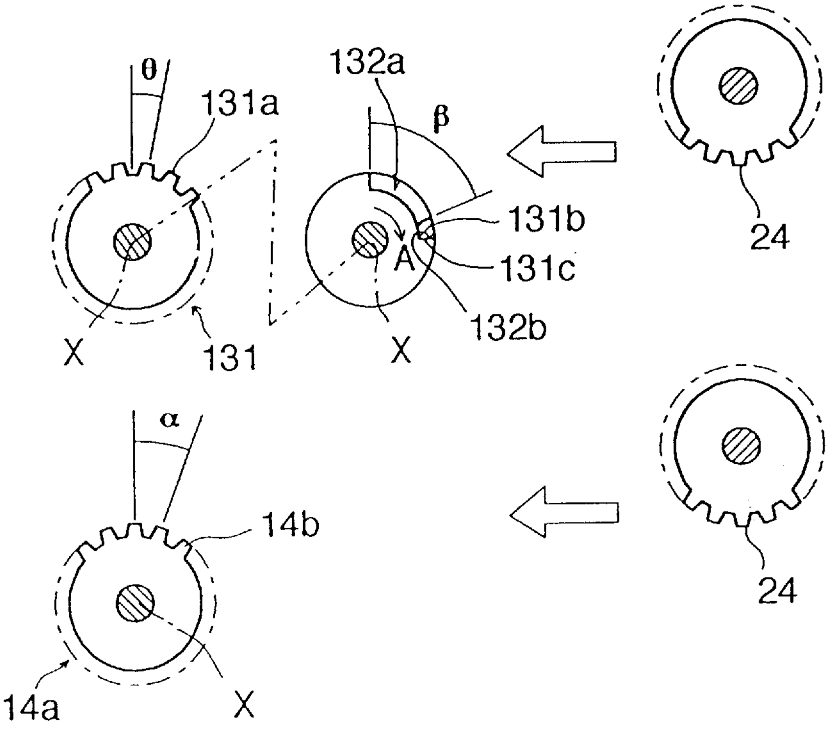
Figure 10:
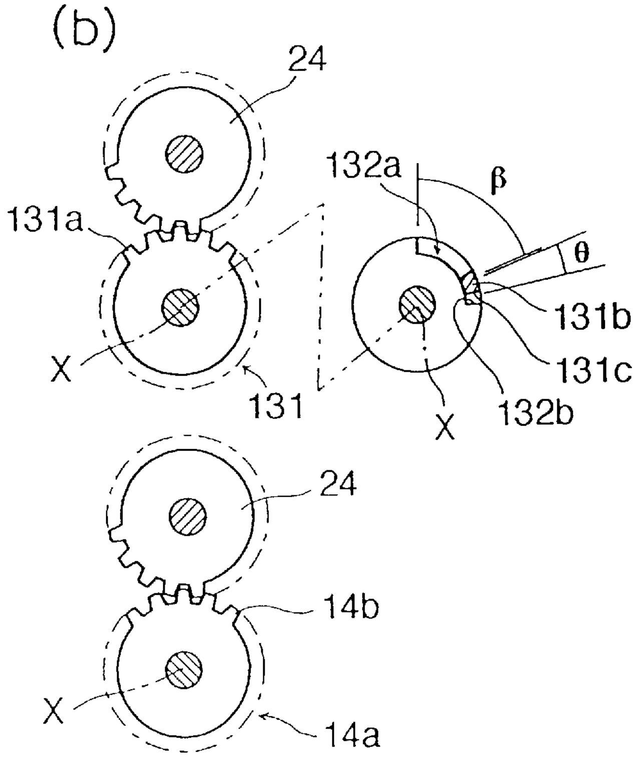
Figure 11:
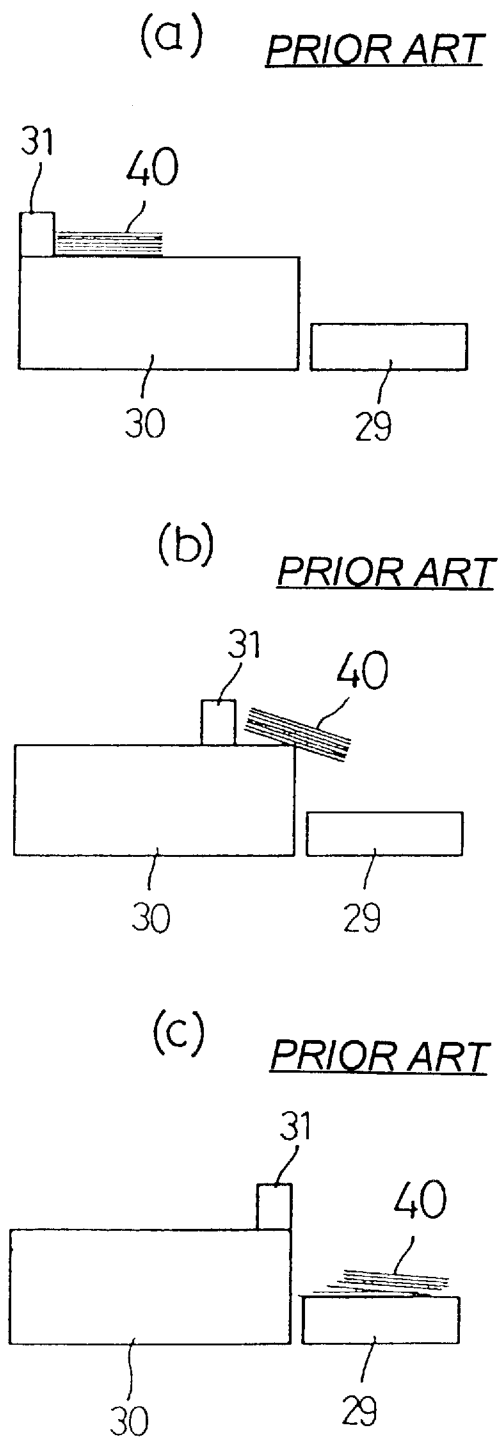

FIGS. 10 show the first gear 13*a* and the second gear 14*a* in planar developments so as to facilitate understanding of their positional relationship.

FIG. 10(*a*) shows a condition before the free gear 24 comes into meshing engagements with the first gear 13*a* and the second gear 14*a*. In this figure, there is an angular difference of θ between the tooth phases of the first and second gears 13*a*, 14*a*. The first gear 13*a* and the second gear 14*a* have a same pitch of α. As the end face portion 131*c* of the projecting portion 131*b* is in the direction of the arrow A by the spring 133, this end face portion 131*c* of the first rotary element 131 and the end face portion 132*b* of the second rotary element 132 are placed in contact with each other. Further, this projecting portion 131*b* is movable by an angle β within the space defined by the recess portion 132*a*. The angle β is set to be at least greater than the angle corresponding to one tooth pitch.

Next, the function of this clutch mechanism 25 according to the second embodiment will be described with reference to FIGS. 10(*a*) and (*b*).

First, as the movable-table support block 6 is moved towards the rear side of the printer, the free gear 24 mounted to the movable-table support block 6 comes into meshing engagements with both the first gear 13*a* and the second gear 14*a*. In this process, due to the above-described angular difference between the tooth phase of the first gear 13*a* and that of the second gear 14*a*, when the meshing engagements take place, the first rotary element 131 is rotated counter-clockwise as illustrated in FIG. 10(*b*), so as to bring the tooth phase of the first gear 13*a* into exact registration with that of the second gear 14*a*. In this state, the projecting portion 131*b* has been moved against the urging force of the spring 133, so that the end face 131*c* and the end face 132*c* are located away from each other.

In the above-described manner, the free gear 24 mounted to the movable-table support mount 6 comes into meshing engagements with the first gear 13*a* of the stopper drive sprocket 13 and the second gear 14*a* of the clutch member 14, thereby to integrally couple the drive shaft 11 and the stopper drive sprocket 13 with each other.

With the above, the stopper drive sprocket 13 is reversely rotated to drive the stopper drive chain 20, whereby the stopper member 3 too is moved towards the rear side of the printer, the motor 22 is stopped, and the belt conveyer 29 is moved the predetermined distance to be set to the initial condition.

[further embodiments]

In the foregoing embodiments, the stop position of the stopper member 3 is varied in association with the lapse of time period after the position detecting plate 26 has traversed the position detector 27. Instead, a plurality of such position detectors 27 may be arranged along the movable path of the position detecting plate 26, so that these position detectors 27 are activated selectively. Or, a single position detector 27 may be rendered adjustable in position along the movable path of the position detecting plate 26, so that the motor 22 may be stopped when this position detector 27 has traversed the position detecting plate 26. In these manners, various modifications will be obvious for one skilled in the art.

Also, in the foregoing, the movable table 2 and the stopper member 3 are moved together and then the stopper member 3 is moved further to the predetermined position corresponding to a designated size of the color prints 40 while the movable table 2 being maintained still. Conversely, first the stopper member 3 may be moved to the position corresponding to the designated size of the prints 40 and then this stopper member 3 will be moved together with the movable table 2. Further alternatively, the movable table 2 and the stopper member 3 may be moved simultaneously at different speeds. Hence, in this respect too, various modifications are conceivable.

In the foregoing embodiment, the movable table 2 and the stopper member 3 are driven by the combination of the sprockets and chains. The driving construction is not limited thereto. For instance, rollers and springs 13 and belts 13 may be employed. In this case, a movable-table drive roller and a stopper drive roller will be employed in place of the movable-table drive sprocket 13 and the stopper drive sprocket 13, respectively. And, a movable-table drive belt and a stopper drive belt will be employed in place of the movable-table drive chain 18 and the stopper drive chain 20, respectively. Further alternatively, a train of gears may be used as the driving construction.

In the second embodiment described above, the first rotary element 131 includes the projecting portion 13*a* while the second rotary element 132 includes the recess portion 132*a*. Conversely, the first rotary element 131 may include a recess portion and the second rotary element 132 may include a projecting portion.

Further, in the second embodiment, the first gear 13*a* is comprised of the two parts of the first rotary element 131 and the second rotary element 132. Instead, the second gear 14*a* may be comprised of two separate parts. In these manners, the mechanism for absorbing the phase difference may be provided to either one or both of the first gear 13*a* and the second gear 14*a*.

Incidentally, when the mechanism for absorbing the tooth phase difference is not used as in the first embodiment, it is preferred that the first and second gears 13*a*, 14*a* have smaller module. Or, a roller type friction transmission mechanism may be employed in place of the gear type mechanism disclosed.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A sorting apparatus for sorting a plurality of prints produced by a photographic printer, comprising:

a movable table for mounting prints thereon, said movable table having an upper surface;

a stopper member disposed on said upper surface of said movable table to be slideable thereon for coming into contact with the prints mounted on said movable table;

said movable table being projectable and retractable relative to the stopper member;

wherein said stopper member is maintained substantially without movement while said movable table is retracted relative to said stopper member, wherein said movable table when retracted causes the prints mounted on said movable table to come into contact with said stopper member and to be dropped off said movable table to be sorted; wherein an upper surface of said movable table has a step for allowing the prints to ride thereon in an overhanging manner, said upper surface having a downward inclination as extending toward a discharge opening of the prints from the printer.

2. A sorting apparatus as claimed in claim 1, wherein said stopper member is rendered movable together with the movable table, such that the movable table is retracted after the stopper member and the movable table are moved together.

3. A sorting apparatus as claimed in claim 1, wherein said stopper member is rendered movable relative to the movable table, such that the movable table is retracted relative to the stopper member after the stopper member is moved relative to the movable table.

4. A sorting apparatus as claimed in claim 1, further comprising:

first driving means for driving the movable table;

second driving means for driving the stopper member; and a drive source for driving both first and second driving means.

5. A sorting apparatus for sorting a plurality of prints produced by a photographic printer, which comprises:

a movable table for mounting the prints thereon;

a stopper member disposed on an upper surface of the movable table for coming into contact with the prints mounted on the movable table;

the movable table being projectable and retractable relative to the stopper member;

with a retracting movement of the movable table relative to the stopper member, the prints mounted on the movable table being caused to come into contact with the stopper member and to be dropped off the table to be sorted;

first driving means for driving the movable table;

second driving means for driving the stopper member; and a drive source for driving both first and second driving means;

a movable-table support block for supporting the movable table;

a stopper support block for supporting the stopper member; and a slide shaft on which the movable-table support block and the stopper support block are slidably mounted;

wherein said first drive means includes a first rotary element and a first connecting member operatively associated with said first rotary element;

said second drive means includes a second rotary element and a second connecting member operatively associated with said second rotary element;

said movable-table support block is engaged with said first connecting member;

said stopper support block is engaged with said second connecting member; and said first rotary element and said second rotary element are disposed coaxially.

6. A sorting apparatus as claimed in claim 5, wherein said first rotary element and said second rotary element respectively are sprockets, and said first connecting member and said second connecting member respectively are chains engaging with said sprockets.

7. A sorting apparatus as claimed in claim 5, wherein at least one of the first gear and second gear includes a mechanism for absorbing a difference between the tooth phases of these first and second gears.

8. A sorting apparatus as claimed in claim 5, further comprising a position detector for detecting a position of the stopper support block for controlling a change in the stop position of the stopper member.

9. A sorting apparatus as claimed in claim 5, wherein said drive source comprises a reversible motor;

the first rotary element and the second rotary element are mounted on a single drive shaft to be rotatable relative to each other;

said drive shaft and the first rotary element are operatively coupled with each other via a friction mechanism;

said drive shaft and the second rotary element are operatively coupled with each other via a one-way clutch mechanism;

a stopper is provided for coming into contact with the movable-table support block for regulating movement of the movable-table support block; and said drive shaft is operatively coupled with said reversible motor.

10. A sorting apparatus as claimed in claim 9, wherein said clutch mechanism includes a first gear formed integral with the second rotary element, a second gear fixed to the drive shaft, and a free gear mounted to the movable-table support block, rotation of the second gear being transmitted via the free gear to the first gear.

11. A sorting apparatus comprising;

a receiving location for receiving a predetermined number of prints from a photographic printer;

a dropping location where the prints are dropped off the receiving location;

a casing substantially extending from the receiving location to said dropping location;

a movable table supported on said casing to be movable between said receiving location and said dropping location, said movable table having a first end face and a second end face with respect to a print-transport direction;

a stopper member supported on said casing to be slideable between said first end face and said second end face along an upper surface of said movable table so that the prints placed on said upper surface of the movable table can be slid and transported; and a drive mechanism for said movable table and said stopper member, said drive mechanism having an independent drive mode for moving said movable table and said stopper member independently of each other, and a simultaneous drive mode for moving said movable table and said stopper member simultaneously and integrally with each other;

wherein said simultaneous drive mode of said drive mechanism causes the prints to approach said dropping location of said sorting apparatus, an independent movement of said stopper member in said independent drive mode causes the prints to be slid on said movable table and transported to said dropping location, and a subsequent and sole movement of said movable table in said independent drive mode toward said dropping location causes the prints to be dropped said movable table onto the dropping location.

* * * * *